United States Patent [19]

Murayama et al.

[11] 4,278,747
[45] Jul. 14, 1981

[54] ELECTROPHOTOGRAPHIC PLATE COMPRISING A CONDUCTIVE SUBSTRATE AND A PHOTOSENSITIVE LAYER CONTAINING AN ORGANIC PHOTOCONDUCTOR LAYER COMPOSED OF A HYDRAZONE COMPOUND

[75] Inventors: Tetsuo Murayama, Machida; Shigenori Otsuka, Tokyo; Tsunemitsu Tajima, Kawasaki, all of Japan

[73] Assignee: Mitsubishi Chemical Industries Limited, Tokyo, Japan

[21] Appl. No.: 33,401

[22] Filed: Apr. 26, 1979

[30] Foreign Application Priority Data

May 17, 1978 [JP] Japan .................................. 53/58536

[51] Int. Cl.$^3$ .............................................. G03G 5/06
[52] U.S. Cl. ........................................ 430/82; 430/70; 430/75; 430/79; 430/58; 430/73
[58] Field of Search ...................... 430/70, 71, 72, 73, 430/74, 75, 79, 58, 82

[56] References Cited

U.S. PATENT DOCUMENTS 3,066,023  11/1962  Schlesinger .......................... 430/70
4,026,704   5/1977  Rochlitz et al. ..................... 430/58
4,075,013   2/1978  Ward et al. .......................... 430/58
4,150,987   4/1979  Anderson et al. .

FOREIGN PATENT DOCUMENTS 3512525  12/1958  Japan .
 930988   7/1963  United Kingdom ...................... 430/70

Primary Examiner—Edward C. Kimlin
Assistant Examiner—John L. Goodrow
Attorney, Agent, or Firm—Oblon, Fisher, Spivak, McClelland & Maier

[57] ABSTRACT

An electrophotographic plate comprising a conductive substrate and a photosensitive layer containing an organic photoconductor layer composed of a hydrazone compound represented by the general formula (I):

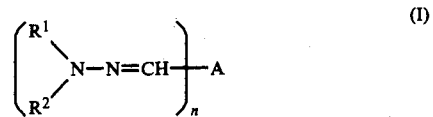

(wherein $R^1$ and $R^2$ are an alkyl, aralkyl or aryl group which may or may not have a substituent, n is a number of 1 or 2, and A is an aromatic hydrocarbyl group or aromatic heterocyclic group which may or may not have a substituent) and a binder.

15 Claims, No Drawings

ELECTROPHOTOGRAPHIC PLATE COMPRISING A CONDUCTIVE SUBSTRATE AND A PHOTOSENSITIVE LAYER CONTAINING AN ORGANIC PHOTOCONDUCTOR LAYER COMPOSED OF A HYDRAZONE COMPOUND

BACKGROUND OF THE INVENTION (1) Field of the Invention

This invention relates to an electrophotographic plate, and more particularly to a high-sensitivity electrophotographic plate having a photosensitive layer containing an organic photoconductive material.

(2) Description of the Prior Art

Heretofore, inorganic photoconductive materials such as selenium, cadmium sulfide and zinc oxide have been popularly used for the photosensitive layer of the electrophotographic plates. Studies on use of organic photoconductive materials for the photosensitive layer of the electrophotographic plates have advanced rapidly in recent years, and some of such studies have materialized into practical use. The organic photocondutive materials have many advantages over the inorganic ones, for example the former is light in weight and easy to fabricate as a film and can also be easily manufactured into a sensitive plate, even a transparent sensitive plate in the case of using certain kinds of such organic materials.

Many studies have been made on the photoconductive polymers including polyvinylcarbazole, but these polymers are not always satisfactory in certain respects such as film-forming properties, flexibility and adhesiveness, and when these polymers are formed into a thin film, such film tends to develop cracks or separate from the substrate. Additives such as plasticizer, binder, etc., are added to eliminate said defects, but addition of such additives gives rise to additional problems such as reduced sensitivity and increased residual potential. Thus, it was very difficult to obtain a practical sensitive plate comprising organic photoconductive materials.

On the other hand, the low-molecular organic photoconductive compounds allow easy production of a sensitive plate with excellent mechanical properties because such compounds permit selection of a polymer with excellent film-forming properties, flexibility, adhesiveness and other properties as binder, but it was difficult to find out a compound suited for making a high-sensitivity plate.

In view of the above, the present inventors have pursued further research into the organic low-molecular photoconductive compounds capable of providing a high-sensitivity, and high-durability of electrophotographic plate and, as a result, found that certain specified hydrazone compounds are best suited for the purpose envisaged. This invention was reached on the basis of such finding.

SUMMARY OF THE INVENTION

An object of this invention is to provide an electrophotographic plate with extremely high sensitivity.

Another object of this invention is to provide an electrophotographic plate with minimized residual potential which may cause background deposition of toner.

Still another object of this invention is to provide an electrophotographic plate which is limited in variations of surface potential or sensitivity and accumulation of residual potential resulting from repeated uses.

A further object of this invention is to provide an electrophotograhic plate with excellent durability.

The present invention, as taken in the broadest sense thereof, is intended to provide an electrophotographic plate characterized by having an electroconductive substrate and a photosensitive layer containing an organic photoconductor layer composed of a hydrazone compound represented by the general formula (I):

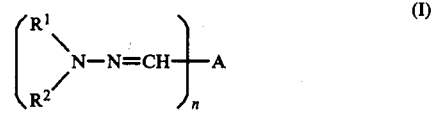

(wherein $R^1$ and $R^2$ are an alkyl, aralkyl or aryl group which may or may not have a substituent, n is a number of 1 or 2, and A is an aromatic hydrocarbyl group or aromatic heterocyclic group which may or may not have a substituent) and a binder.

DETAILED DESCRIPTION OF THE INVENTION

The photosensitive layer of the electrophotographic plate according to this invention has at least one organic photoconductor layer containing a binder and a hydrazone compound represented by the general formula (I):

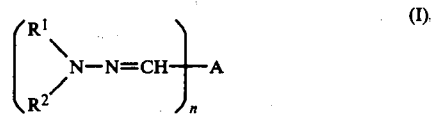

In the above formula (I), $R^1$ and $R^2$ represent an alkyl group such as methyl group, ethyl group, straight-chain or branched propyl group, butyl group, pentyl group, hexyl group, etc.; an aralkyl group such as benzyl group, phenethyl group, cinnamyl group, benzhydryl group, naphthylmethyl group, etc.; or an aryl group such as phenyl group, naphthyl group, anthryl group, pyrenyl group, acenaphthenyl group, fluorenyl group, etc. Most preferred among them is an aryl group, particularly a phenyl group. Said alkyl, aralkyl or aryl group may or may not have a substituent such as, for example, an alkyl group such as methyl group or ethyl group, a halogen atoms such as chlorine atom or bromine atom, an alkoxy group such as methoxy group or ethoxy group, an aryloxy group such as phenoxy group, an amino group such as dimethylamino group or diethylamino group, and an alkylthio group such as methylthio group or ethylthio group.

Also in the above general formula (I), A represents a mono- or divalent aromatic hydrocarbyl group derived from benzene, naphthalene, anthracene, pyrene, acenaphthene, acenaphthylene, azulene, fluorene or the like; or a mono- or divalent aromatic heterocyclic group derived from dibenzofuran, carbazole, indole, thiophene, furan, pyrrole, pyrazole, acridine, xanthene or the like. Such aromatic hydrocarbyl and heterocyclic groups may or may not have a substituent, and such substituent may be selected from those mentioned above as the substituents which may be possessed by said alkyl, aralkyl and aryl groups. Most preferably, A is an N-ethylcarbzolyl group or N,N-dialkylaminophenyl group.

In the general formula (I), n represents the number of 1 when A is a monovalent group and the number of 2 when A is a divalent group.

The hydrazone compound represented by the general formula (I) can be easily produced by a known method. For example, such compound can be obtained by reacting a substituted hydrazine represented by the following general formula (II):

wherein $R^1$ and $R^2$ represent the same groups as defined in the aforeshown general formula (I)) or its mineral acid salts with an aldehyde represented by the general formula (III):

(wherein n and A are as defined in the general formula (I)) in a slvent in a usual way. An alcohol such as methanol or ethanol, or acetic acid is favorably used as the solvent in this reaction, but it is also possible to use other types of solvent such as tetrahydrofuran either singly or in admixture.

Listed hereinbelow are the typical examples of the hydrazone compounds that can be produced in the manner described above. (In the following formulae, "Ph" represents phenyl group).

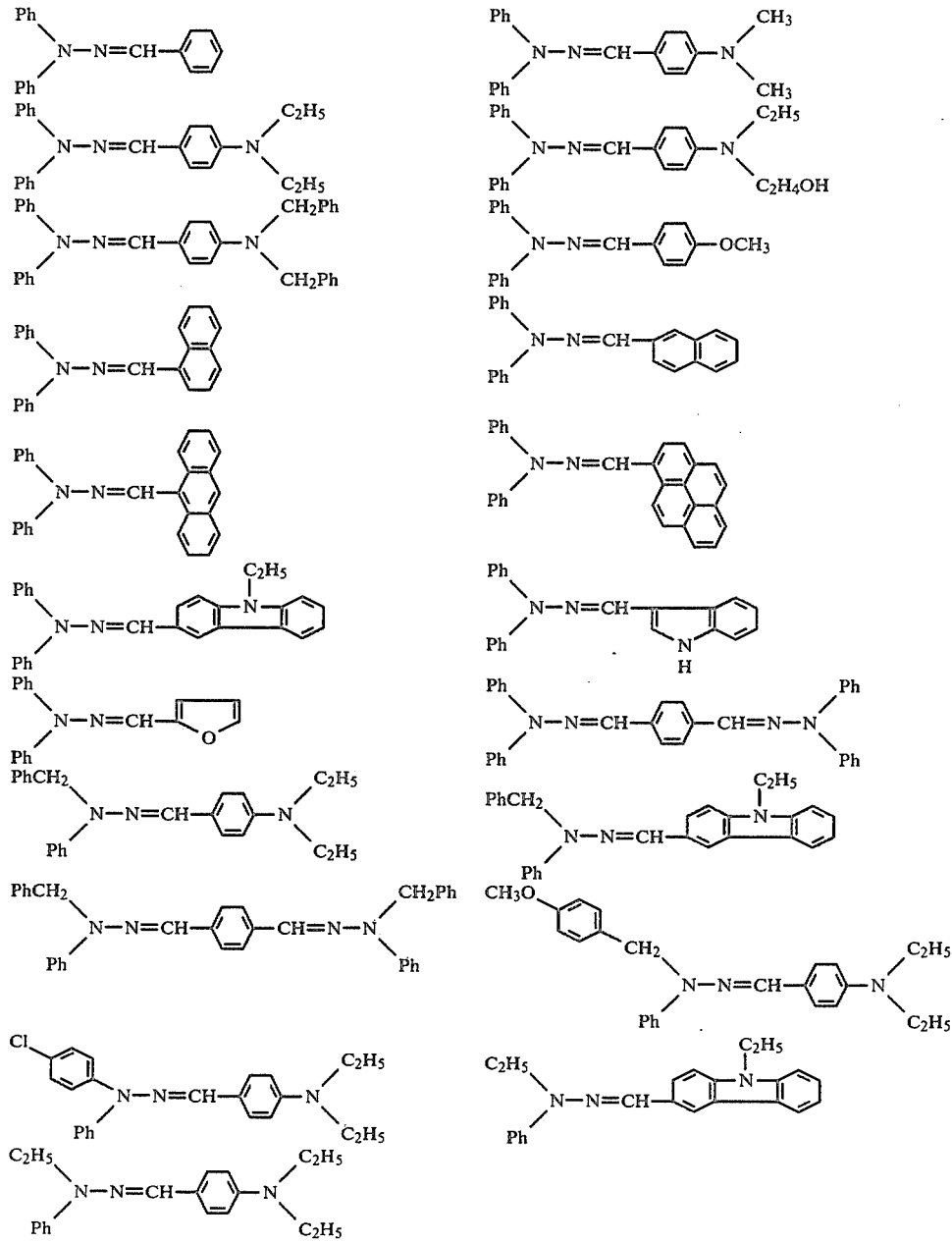

The electrophotographic plate according to this invention has a photosensitive layer having an organic photoconductor layer containing at least one hydrazone compound represented by the above-shown general formula (I).

The hydrazone compounds represented by the general formula (I) have very excellent properties as organic photoconductor, and particularly when used as a charge transporting material, they can provide a photosensitive plate with high sensitivity and excellent durability.

Various types of photosensitive layer are known and used in electrophotographic plates, and any of such known types of photosensitive layer can be employed for the electrophotographic plate of this invention. Examples of such photosensitive layers usable in this invention include the following: a photosensitive layer composed of an organic photoconductor layer formed by adding to a binder said hydrazone compound and, if need be, a dye which serves as a sensitizer or an electron acceptor which forms a charge transfer complex with said hydrazone compound; a photosensitive layer composed of an organic photoconductor layer formed by adding to a binder a photoconductive material which, when absorbing light, generates a charge carrier at extremely high efficiency and said hydrazone compound; or a photosensitive layer consisting of a double-layer composed of an organic photoconductor layer (functioning as a charge transporting layer) formed from said hydrazone compound and a binder and a charge generating layer formed from a photoconductive material which generates a charge carrier at very high efficiency upon absorbing light, or from said photoconductive material and a binder.

In the present invention, when an organic photoconductor layer containing a hydrazone compound represented by the general formula (I) is used as the charge transporting layer of the double layered photosensitive lyaer formed from said charge transporting layer and a charge generating layer, there can be obtained a high-durability, photosensitive plate which is high in sensitivity and small in residual potential and which, when used repeatedly, suffers little variation of the surface potential and is minimized in reduction of sensitivity and accumulation of residual potential.

For the production of the electrophotographic plate according to this invention, first a hydrazone compound represented by the general formula (I) is dissolved in a suitable solvent together with a binder in a usual way to obtain a coating solution and, if need be, this solution is further comprised of a photoconductive material which generates a charge carrier at extremely high efficiency upon absorbing light, a dye serving as a sensitizer, an electron acceptor which forms a charge transfer complex with said hydrazone compound, a plasticizer, a pigment and other additives, and the thus prepared solution is applied on a conductive substrate and then dried to form on said substrate an organic photoconductor layer with a thickness of usually several $\mu m$ to several tens of $\mu m$. In the case of the double-layered photosensitive layer formed from a charge generating layer and a charge transporting layer (that is, organic photoconductor layer), said solution is applied on said charge generating layer or the charge generating layer is formed on the charge transporting layer which is formed by applying said solution.

The solvent used for the preparation of said coating solution may be selected from solvents capable of dissolving said hydrazone compounds such as: ethers such as tetrahydrofuran, 1,4-dioxane, etc.; ketones such as methyl ethyl ketone, cyclohexanone, etc.; aromatic hydrocarbons such as toluene, xylene, etc.; dipolar aprotic solvents such as N,N-dimethylformamide, acetonitrile, N-methylpyrrolidone, dimethyl sulfoxide, etc.; esters such as ethyl acetate, methyl formate, methyl cellosolve acetate, etc.; chlorinated hydrocarbons such as dichloroethane, chloroform, etc. It is of course necessary that these solvents are capable of dissolving the binder used.

The binders usable in this invention include various kinds of polymers or resins compatible with said hydrazone compounds such as: polymers and copolymers of the vinyl compounds such as styrene, vinyl acetate, vinyl chloride, acrylic acid esters, methacrylic acid esters, butadiene, etc.; polyvinyl acetals, polycarbonates, polyesters, polysulfones, polyphenylene oxides, polyurethanes, cellulose esters, cellulose ethers, phenoxy resins, silicone resins, epoxy resins, etc. Such binder is usually used in an amount 0.5 to 30 times, preferably 1 to 10 times by weight the amount of the hydrazone compound used.

The charge-generating photoconductor material, dye and electron acceptor, which are added, at need, to said photosensitive layer, may be of the known types.

The photoconductive material which generates a charge carrier at extremely high efficiency upon light absorption may be selected from: inorganic photoconductive materials such as selenium, selenium alloys such as selenium-tellurium alloy or selenium-arsenic alloy, and cadmium sulfide; and organic photoconductive materials such as phthalocyanine pigments such as copper phthalocyanine, perione pigments, thioindigo pigments, quinacridone pigments, perylene pigments, anthraquinone pigments, azo pigments, bisazo pigments, and cyanine pigments, etc. Most preferred among these photoconductive compounds are selenium, selenium-tellurium alloy, selenium-arsenic alloy, phthalocyanine pigments such as copper phthalocyanine, perylene pigments and bisazo pigments. Examples of the perylene pigments are:

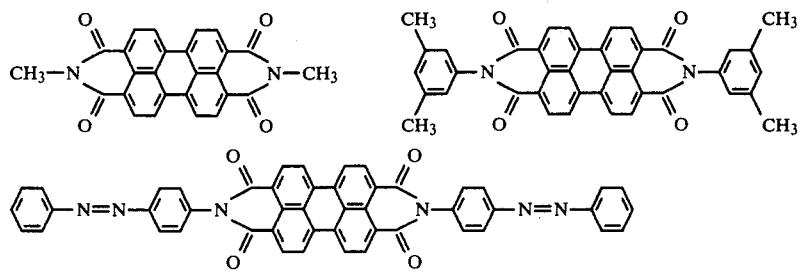

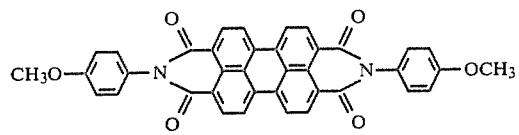
Examples of the bisazo pigments include the following:
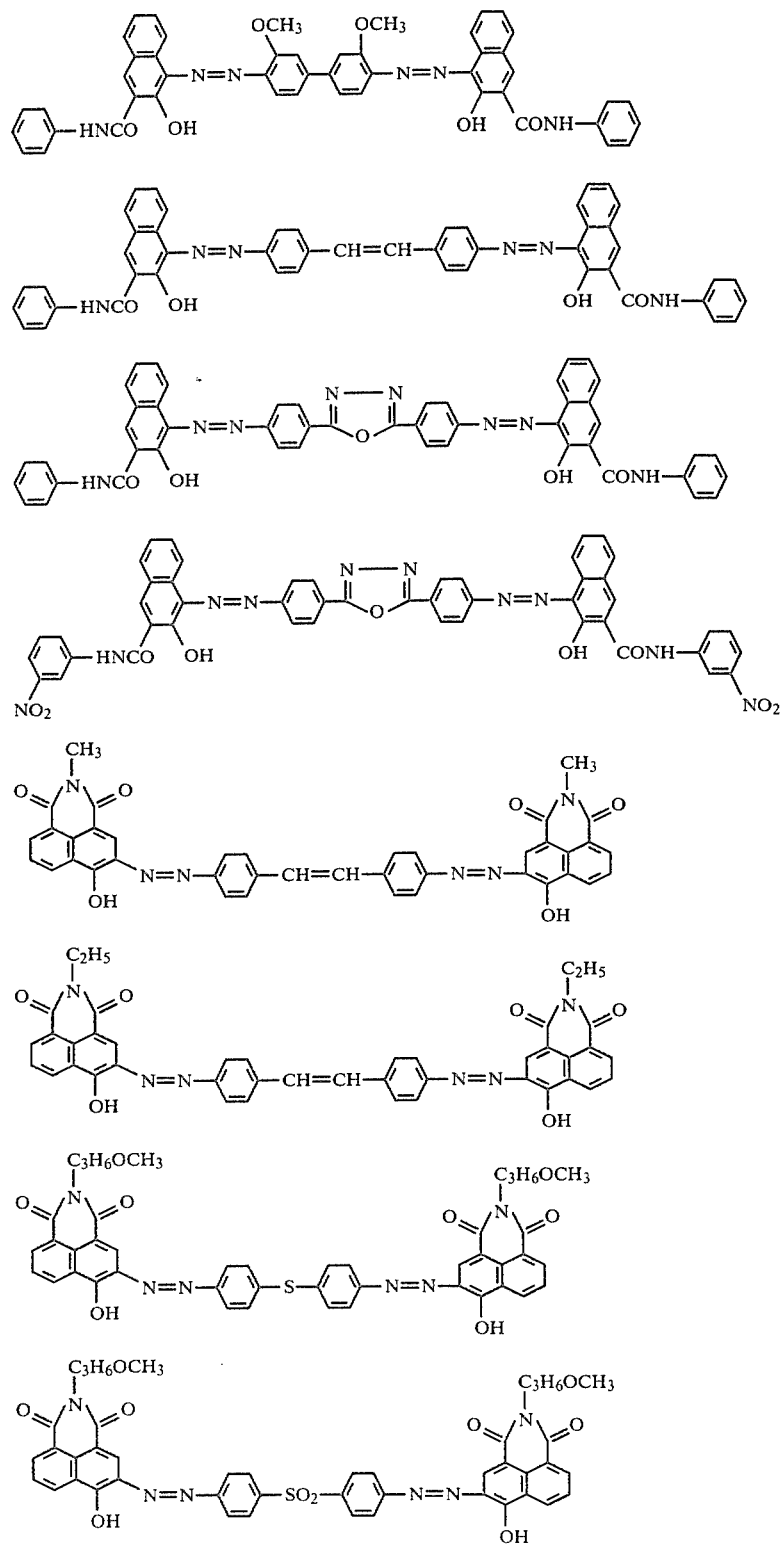

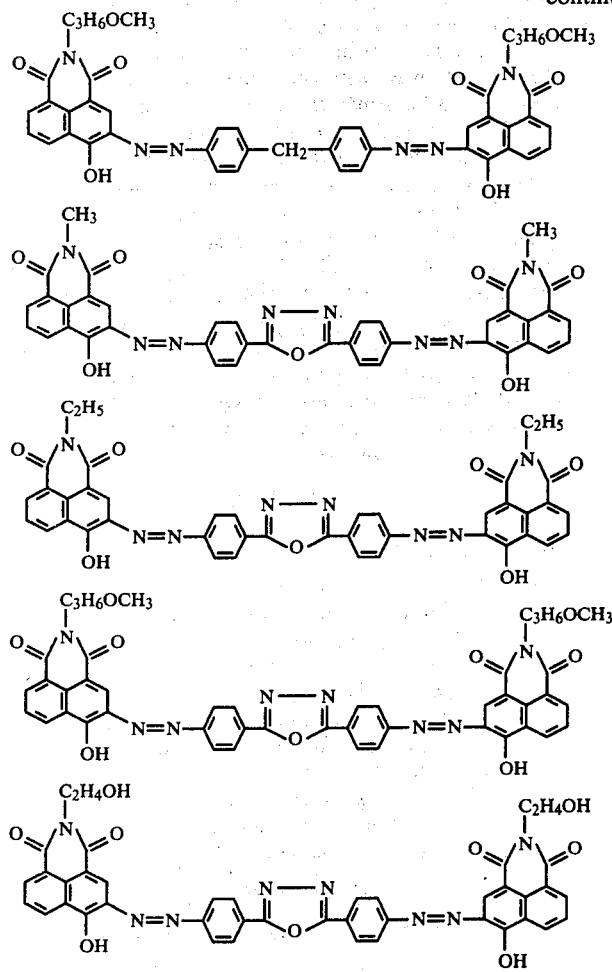

Most preferred among these bisazo pigments are bisazo compounds prepared by using a 3-hydroxy-2-naphthamide derivative or a 4-hydroxy-1,8-naphthalimide derivative as coupler.

The dye used in this invention may be, for example, triphenylmethane dyes such as methyl violet, brilliant green, crystal violet, etc.; thiazine dyes such as methylene blue etc.; quinone dyes such as quinizarin etc.; cyanine dyes; pyrylium salts; thiapyrylium salts; benzopyrylium salts; etc.

Examples of the electron acceptors which form a charge transfer complex with the hydrazone compound in this invention are quinones such as chloranil, 2,3-dichloro-1,4-naphthoquinone, 2-methylanthraquinone, 1-nitroanthraquinone, 1-chloro-5-nitroanthraquinone, 2-chloroanthraquinone, phenanthrenequinone, etc.; aldehydes such as 4-nitrobenzaldehyde, etc.; ketones such as 9-benzoylanthracene, indandione, 3,5-dinitrobenzophenone, 2,4,7-trinitrofluorenone, 2,4,5,7-tetranitrofluorenone, 3,3',5,5'-tetranitrobenzophenone, etc.; acid anhydrides such as phthalic anhydride, 4-chloronaphthalic anhydride, etc.; cyano compounds such as terephthalalmalononitrile, 4-nitrobenzalmalononitrile, etc.; phthalides such as 3-benzalphthalide, 3-($\alpha$-cyano-p-nitrobenzal)phthalide, 3-($\alpha$-cyano-p-nitrobenzal)-4,5,6,7-tetrachlorophthalide, etc.

Further, the photosensitive layer of the electrophotographic plate according to this invention may contain a known type of plasticizer for improving the film-forming properties, flexibility and mechanical strength. The plasticizer to be added in said coating solution for said purpose is, for example, phthalic acid esters, phosphoric acid esters, epoxy compounds, chlorinated paraffins, chlorinated fatty acid esters, aromatic compounds such as methylnaphthalene, etc. In the case of using the hydrazone compound as a charge transporting material in the charge transporting layer, the coating solution may be of the above-said composition, but the charge-generating photoconductive material, dye and electron acceptor may be excluded or they may be added in smaller quantities. The charge-generating layer used in this case may be a thin layer (vacuum evaporation layer) obtained by vacuum-evaporating said charge-generating photoconductive material and, if necessary, a dye and an electron acceptor, or a thin layer (aggregate layer of the photoconductive material particles) obtained by applying and drying a coating solution prepared by dissolving or dispersing said charge-generating photoconductive material in a solvent, or a thin layer (dispersion layer of the photoconductive material particles) obtained by applying and drying a coating solution prepared by dispersing said charge-generating photoconductive material in a solvent together with a binder and/or other organic photoconductive material.

Needless to say, the thus obtained sensitive plate of this invention may have an auxiliary layer such as an adhesive layer, intermediate layer or transparent insulating layer as in the commercially available electrophotographic sensitive plates. The conductive substrate on which the photosensitive layer is formed may be of any known type which is commonly used for the electrophotographic plates. To cite some examples, such substrate may be a drum or sheet of a metal such as aluminum, copper, etc., or a laminate of such metal foils, or a metallized sheet thereof. It is also possible to use a plastic film, paper sheet or the like which has conductive surface obtained by applying a conductive material such as metal powder, carbon black, copper iodide, high-molecular electrolyte or such with a suitable binder.

While the electrophotographic plate according to this invention has been described in detail, it should be also noted that the hydrazone compound employed for the production of such electrophotographic plate has high charge carrier transporting efficiency and can be therefore used in combination with various types of charge carrier generating materials. It also allows obtainment of a sensitive plate with excellent printing durability because of its good compatibility with resins, particularly with polycarbonates, polyesters, acrylic and methacrylic resins. Further, the hydrazone compound contained in the photosensitive layer has excellent transparency and allows light transmission even in a double layer type comprising a charge carrier transporting layer on a charge carrier generating layer, making it possible to obtain a high-sensitivity plate.

Thus, the plate provided according to this invention is very high in sensitivity, small in residual potential that may cause background deposition of toner, minimized in accumulation of residual potential from repeated uses and variations in surface potential and sensitivity, and also excellent in durability.

The invention is now described in further detail by way of the following examples, but it will be understood that the scope of this invention is not limited to these examples but covers other forms of embodiments without departing from the gist of the invention. All the "parts" appearing in the following Examples are by weight unless otherwise specified.

EXAMPLE 1

1,1-diphenylhydrazine and N-ethylcarbazole-3-carbaldehyde were reacted in ethanol at room temperature to obtain N-ethylcarbazole-3-carbaldehyde diphenylhydrazone with melting point of 160.2°–160.5° C., and 60 parts of this hydrazone compound and 100 parts of a polyester (Vylon 200 by Toyobo Co., Ltd.) were dissolved in 450 parts of tetrahydrofuran to prepare a coating solution. Then selenium was vacuum evaporated on a 10 μm thick aluminum foil laminated on a 75 μm thick polyester film to form a charge generating layer with thickness of approximately 0.3 μm, and to this layer was applied the above-said coating solution by a film applicator and dried to form a 20 μm thick charge transporting layer. In this way, there was obtained a double-layer type electrophotographic plate.

The sensitivity, or half-decay exposure intensity ($E_{\frac{1}{2}}$), of this plate was 6 lux.sec. The half-decay exposure intensity was determined by first charging the plate by −5.5 KV corona discharge in a dark place, then exposing it to incandescent light and measuring the exposure intensity required till the surface potential decayed to one half of the initial surface potential. The exposure intensity ($E_{1/5}$) required till the surface potential decayed down to 1/5 of the initial surface potential was 13 lux.sec.

EXAMPLE 2

An electrophotographic plate was produced by following the same procedure as Example 1 except for use of a vacuum evaporation film of selenium-tellurium alloy (15% tellurium content) instead of the selenium evaporation film for the charge generating layer.

$E_{\frac{1}{2}}$ and $E_{1/5}$ of this plate were 1.6 lux.sec and 3.6 lux.sec, respectively.

EXAMPLE 3

Aluminum was deposited on a 100 μm thick polyester film by vacuum evaporation to the thickness of 600 Å, and then phthalocyanine was further deposited thereon to the thickness of approximately 0.2 μm to form a charge generating layer. Then a coating solution prepared by dissolving 60 parts of N,N-diethylamino-p-benzaldehyde diphenylhydrazone (melting point: 93.0°–93.5° C.) and 100 parts of polyester (Vylon 200) in 450 parts of tetrahydrofuran was applied on said charge generating layer by a film applicator and dried to form a 20 μm thick charge transporting layer.

The sensitivity of the thus obtained plate was $E_{\frac{1}{2}}=3$ lux.sec and $E_{1/5}=5.7$ lux.sec.

EXAMPLES 4–8

A bisazo compound having the following structural formula:

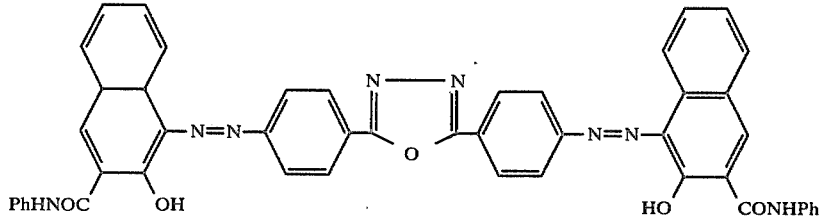

was dispersed in tetrahydrofuran and finely pulverized by a sand grinder, and the dispersion concentration was adjusted such that the bisazo compound: tetrahydrofuran ratio would become 1:90 by parts. This dispersion was applied on the aluminum foil of the same type of laminate film as used in Example 1 by a film applicator such that the weight after drying would become 0.1 g/m² and then dried to form a charge generating layer. Then a solution prepared by dissolving 70 parts of a hydrazone compound shown in Table 1 and 100 parts of a polycarbonate (NOVAREX 7025 A by Mitsubishi Chemical Industries Ltd.) in 850 parts of tetrahydrofuran was applied on said charge generating layer by a film applicator such that the film thickness after drying would become 15 μm and then dried to form a charge transporting layer. There were obtained in this way the electrophotographic plates having a double-layered photosensitive layer.

The sensitivity ($E_{\frac{1}{2}}$) to incandescent light of the thus obtained plates is shown in Table 1. Charging was effected by means of −5 KV corona discharge. In the following table, Ph represents phenyl group.

This plate was subjected to a durability test by an electrostatic paper analyzer (Model SP-428 by Kawaguchi Denki Seisakujo). While rotating the turntable carring the plate sample at the rate of approximately 1,000 r.p.m. according to the dynamic method, the sample plate was subjected to −6.6 KV corona discharge

TABLE 1

| Example | hydrazone compound | melting point of the hydrazone compound | $E_{\frac{1}{2}}$ (lux . sec) |
|---|---|---|---|
| 4 | Ph\N—N=CH—⟨phenyl⟩ / Ph | 124.0–124.5° C. | 21 |
| 5 | Ph\N—N=CH—⟨phenyl⟩—N(CH₃)₂ / Ph | 156.0–156.5° C. | 6.2 |
| 6 | Ph\N—N=CH—⟨anthracene⟩ / Ph | 196.0–197.5° C. | 8.7 |
| 7 | Ph\N—N=CH—⟨phenyl⟩—CH=N—N/Ph / Ph  \Ph | 241.0–241.5° C. | 4.0 |
| 8 | Ph—CH₂\N—N=CH—⟨phenyl⟩—N(C₂H₅)₂ / Ph | 122.5–123.0° C. | 7.5 |

EXAMPLE 9

1 part of a bisazo compound having the following structural formula:

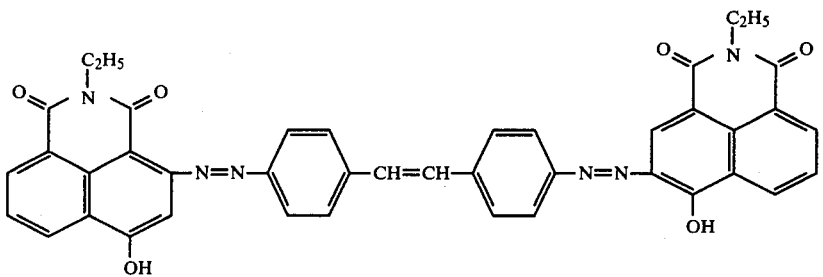

and 1 part of a polyester (Vylon 200 by Toyobo Co., Ltd.) were added to 90 parts of tetrahydrofuran, and the mixture was subjected to a dispersion treatment by a sand grinder after the manner of Example 4 and applied on the aluminum surface of an aluminum foil laminated polyester film such that a deposit of 0.2 g/m² would be provided after drying, thereby forming a charge generating layer. Then a coating solution prepared by dissolving 70 parts of a hydrazone compound (same as used in Example 1), 3 parts of 3-(α-cyano-p-nitrobenzal)-4,5,6,7-tetrachlorophthalide and 100 parts of the above-said polyester (Vylon 200) in a mixed solvent of 700 parts of toluene and 160 parts of methyl ethyl ketone was applied on said charge generating layer such that a film thickness of 15 μm would be provided after drying, thereby forming a charge transporting layer. There was thus obtained an electrophotographic plate having a double-layered photosensitive layer.

for 3 seconds and then exposed to incandescent light with illuminance of 330 lux for 5 seconds, and this cycle was repeated while measuring the sensitivity upon every predetermined number of revolutions according to the static method. The sensitivity before the repetition test was $E_{\frac{1}{2}}=3.0$ lux.sec and $E_{1/5}=5.5$ lux.sec under the conditions of −6 KV corona discharge and 5 lux incandescent light exposure, and the residual potential expressed in terms of surface potential after exposure of 50 lux.sec was −20 V. After 2,000 times of repetition of said charging and exposure, $E_{\frac{1}{2}}$ was 3.4 lux.sec, $E_{1/5}$ was 6.2 lux.sec and residual potential was −10 V. Thus, the variations caused by such 2,000 times of repetition were very limited. The maximum surface potential before exposure was 1,480 V before the repetition test and 1,570 V after 2,000 times of repetition.

This plate was set in an electrophotographic copying machine (U-Bix-800 by Konishiroku Photo Ind. Co., Ltd.) and used for copying an original. There was obtained a clear image with no fogging.

EXAMPLE 10

3 parts of β-type copper phthalocyanine was added to 900 parts of tetrahydrofuran and, after ultrasonic dispersion thereof, 100 parts of a polycarbonate (NOVAREX 7025 A by Mitsubishi Chemical Industries Ltd.) and 60 parts of a hydrazone compound used in Example 1 were added and dissolved in said dispersion to prepare a coating solution, and this solution was applied on the aluminum surface of an aluminum foil laminated polyester film by a film applicator such that the film thickness after drying would become 15 μm and then dried thereby forming a photosensitive layer to obtain an electrophotographic plate. This plate was charged by +6 KV corona discharge in a dark place and then its sensitivity was measured. $E_{\frac{1}{2}}$ was 8 lux.sec.

EXAMPLE 11

100 parts of a hydrazone compound same as used in Example 1, 100 parts of a polyester (Vylon 200) and 10 parts of bromanil were dissolved in 450 parts of tetrahydrofuran, and this solution was applied on the aluminum surface of an aluminum foil laminated film by a film applicator such that a 15 μm film thickness would be provided after drying, thereby forming a photosensitive layer to obtain an electrophotographic plate. This plate was charged by +6 KV corona discharge in a dark place and its sensitivity was measured, obtaining $E_{\frac{1}{2}} = 223$ lux.sec.

EXAMPLE 12

Aluminum was deposited on a 75 μm thick polyester film by vacuum evaporation to the thickness of 600 Å and then a 1 μm thick intermediate layer composed of a polyamide (CM-4000 by Toray Industries Inc.) was formed thereon, followed by further provision thereon of a charge generating layer same as provided in Example 9. Then a coating solution prepared by dissolving 80 parts of a hydrazone compound same as used in Example 1, 0.8 part of 3-(α-cyano-p-nitrobenzal)-4,5,6,7-tetrachlorophthalide, 4 parts of 1,1-dicyano-2-(9'-anthryl) ethylene and 100 parts of a methacrylic resin (DIANAL BR-85 by Mitsubishi Rayon Co., Ltd.) in a mixed solvent of 700 parts of toluene and 160 parts of methyl ethyl ketone was applied on said charge generating layer such that a 25 μm film thickness would be provided after drying, thereby forming a double-layered photosensitive layer to obtain an electrophotographic plate.

This plate was wound on an aluminum drum with outer diameter of 60 mm and used as the sensitive plate for a copying machine (Type EG-101 by Minolta Camera Co., Ltd.). After 100,000 times of repetition of charging and exposure, there could still be obtained a clear, fog-free image little different from the initial image, indicating very excellent durability of this plate.

EXAMPLE 13

A charge generating layer same as used in Example 4 was provided on an intermediate layer formed in the same way as Example 12, and then a coating solution prepared by dissolving 60 parts of a hydrazone compound same as used in Example 1, 1.2 parts of 3-(α-cyano-p-nitrobenzal)-4,5,6,7-tetrachlorophthalide and 100 parts of a polyester (Vylon 200) in a mixed solvent of 700 parts of toluene and 160 parts of methyl ethyl ketone was applied on said charge generating layer such that a 28 μm film thickness would be provided after drying, thereby forming a charge transporting layer to obtain an electrophotographic plate having a double-layered photosensitive layer.

This plate was subjected to a repetition test by an electrostatic paper analyzer same as used in Example 9. By using the dynamic method, the plate was subjected to 2-second charging at −6.5 KV, 0.5-second standing in a dark place and 1-second exposure to 350 lux incandescent light and this cycle was repeated while measuring the sensitivity upon every predetermined number of revolutions according to the static method. The results are shown in Table 2. The measurement according to the static method was made under the conditions of 6 KV corona discharging voltage and 5 lux incandescent light illuminance. In the table, Vm indicates the maximum surface potential before exposure and Vr indicates the residual potential after 10-second exposure. Sensitivity was expressed in terms of exposure intensity required till the surface potential dropped from 1,400 V to 700 V. It will be noted that the variations of Vm, Vr and sensitivity are very small.

TABLE 2

| number of revolutions | Vm (V) | Vr (V) | Sensitivity (lux . sec) |
|---|---|---|---|
| 0 | −1870 | −10 | 4.5 |
| 1,000 | −1800 | − 5 | 4.0 |
| 2,000 | −1840 | −10 | 4.5 |
| 5,000 | −1820 | − 5 | 4.5 |
| 7,000 | −1840 | −15 | 4.6 |
| 10,000 | −1800 | −10 | 4.5 |

What is claimed is:

1. An electrophotographic plate comprising a conductive substrate and a photosensitive layer coated thereon; wherein said photosensitive layer comprises an organic photoconductor layer; and wherein said organic photoconductor layer comprises a hydrazone compound represented by the general formula (I):

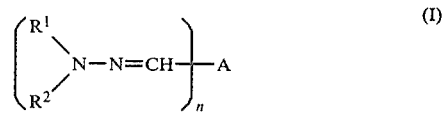

wherein $R^1$ and $R^2$ are independently selected from the group consisting of substituted or unsubstituted alkyl, substituted or unsubstituted aralkyl, and substituted or unsubstituted aryl, n is a number of 1 or 2, and A is an unsubstituted or substituted aromatic heterocyclic group, and a binder.

2. The electrophotographic plate, according to claim 1, wherein at least one of $R^1$ and $R^2$ in the general formula (I) is an aryl group.

3. The electrophotographic plate, according to claim 1, wherein A in the general formula (I) is N-ethylcarbazolyl group.

4. The electrophotographic plate, according to any of claims 1 to 3, wherein the organic photoconductor layer contains a dye.

5. The electrophotographic plate, according to any of claims 1 to 3, wherein the organic photoconductor layer contains an electron acceptor which forms a charge transfer complex with said hydrazone compound.

6. The electrophotographic plate, according to any of claims 1 to 3, wherein the organic photoconductor layer contains a photoconductive material with high charge generating efficiency selected from the group consisting of selenium, selenium alloys, cadmium sulfide, phthalocyanine pigments, perinone pigments, thioindigo pigments, quinacridone pigments, perylene pigments, anthraquinone pigments, azo pigments, bisazo pigments and cyanine pigments.

7. The electrophotographic plate, according to any of claims 1 to 3, wherein said photosensitive layer comprises a double-layer composed of said organic photoconductor layer functioning as a charge transporting layer and a charge generating layer containing a photoconductive material with high charge generating efficiency selected from the group consisting of selenium, selenium alloys, cadmium sulfide, phthalocyanine pigments, perinone pigments, thioindigo pigments, quinacridone pigments, perylene pigments, anthraquinone pigments, azo pigments, bisazo pigments and cyanine pigments.

8. The electrophotographic plate, according to claim 7, wherein the charge generating layer is formed from an aggregate of the particles of said photoconductive material with high charge generating efficiency.

9. The electrophotographic plate, according to claim 7, wherein the charge generating layer is a dispersion of the particles of said photoconductive material with high charge generating efficiency in a binder.

10. The electrophotographic plate, according to claim 8, wherein said photoconductive material with high charge generating efficiency is at least one material selected from the group consisting of selenium, selenium alloys, cadmium sulfide, phthalocyanine pigment, perinone pigment, perylene pigment, bisazo pigment and cyanine pigment.

11. The electrophotographic plate, according to claim 9, wherein said photoconductive material with high charge generating efficiency is a bisazo pigment.

12. The electrophotographic plate, according to claim 7, wherein said charge generating layer is a vacuum evaporation layer of said photoconductive material with high charge generating efficiency.

13. The electrophotographic plate, according to claim 12, wherein said photoconductive material with high charge generating efficiency is at least one of the group consisting of selenium, selenium alloys, phthalocyanine pigment and perylene pigment.

14. The electrophotographic plate, according to claim 9, wherein said photoconductive material is at least one material selected from the group consisting of selenium, selenium alloys, cadmium sulfide, phthalocyanine pigment, perinone pigment, perylene pigment, bisazo pigment and cyanine pigment.

15. The electrophotographic plate, according to claim 8, wherein said photoconductive material is a bisazo pigment.

* * * * *